United States Patent [19]

Nadkarni et al.

[11] 4,440,572
[45] Apr. 3, 1984

[54] METAL MODIFIED DISPERSION STRENGTHENED COPPER

[75] Inventors: Anil V. Nadkarni, Mentor; Prasanna K. Samal, Lyndhurst, both of Ohio

[73] Assignee: SCM Corporation, New York, N.Y.

[21] Appl. No.: 389,605

[22] Filed: Jun. 18, 1982

[51] Int. Cl.³ .......................... B22F 3/00; C22C 1/05
[52] U.S. Cl. ........................................ 75/232; 419/19; 419/41; 419/46; 75/235
[58] Field of Search ............... 419/19, 41, 46; 75/235, 75/232

[56] References Cited

U.S. PATENT DOCUMENTS

| | | | |
|---|---|---|---|
| 3,026,200 | 3/1962 | Gregory | 72/224 |
| 3,143,789 | 8/1964 | Iler et al. | 29/182.5 |
| 3,179,515 | 4/1965 | Grant et al. | 75/206 |
| 3,459,546 | 8/1969 | Lambert | 419/46 |
| 3,533,760 | 10/1970 | Weizenbach et al. | 419/19 |
| 3,779,714 | 12/1973 | Nadkarni et al. | 29/182.5 |
| 4,274,873 | 6/1981 | Nadkarni | 75/211 |
| 4,315,777 | 2/1982 | Nadkarni et al. | 419/19 |

Primary Examiner—Brooks H. Hunt
Attorney, Agent, or Firm—R. A. Sturges; M. H. Douthitt

[57] ABSTRACT

A process for making a novel alloy of a dispersion strengthened copper by blending dispersion strengthened copper powder and a powdered modifying metal, heat treating the blend to form the alloy, and the compacting and working the compact to densify it.

13 Claims, 4 Drawing Figures

METAL MODIFIED DISPERSION STRENGTHENED COPPER

This invention relates to dispersion strengthened metals and more particularly to a metal modified dispersion strengthened copper.

BACKGROUND OF THE INVENTION AND PRIOR ART

Dispersion strengthened copper (DSC) has high strength and electrical conductivity at room temperature. It also has excellent structural stability up to temperatures approaching the melting point of the matrix (1083° C.; 1981° F.). This stability is responsible for its excellent strength retention characteristics at and after exposure to elevated temperatures. These properties are derived from the relatively small amounts (e.g., 0.05% to 5.0% as the metal) of dispersoid which is generally a stable metal oxide, especially a refractory metal oxide, such as alumina, silica, magnesia, thoria, beryllia, zirconia or the like. Alumina, $Al_2O_3$, generated internally from aluminum metal by internal oxidation is commonly used. Reference may be had to U.S. Pat. No. 3,779,714 for one internal oxidation method and various dispersion strengthened copper compositions producible thereby. The disclosure of that patent is incorporated herein by reference. Reference may also be had to U.S. Pat. Nos. 4,274,873, 4,315,770 and 4,315,777 for other methods of producing dispersion strengthened copper powder. These patents are also incorporated herein by reference.

There are many applications in the field where one or more of the basic characteristics of dispersion strengthened copper are important, but one or more additional requirements render dispersion strengthened copper unsuitable. A case in point is eyeglass frame wire. This application, for example, requires that the material have strength retention ability when exposed to brazing temperatures, generally in the 1200° F. to 1600° F. (649° C. to 871° C.) range. In addition, it must have spring properties superior to what dispersion strengthened copper has.

The spring properties of dispersion strengthened copper can be significantly improved by alloying the copper with other metals (in addition to the solute metal for internal oxidation), particularly tin. Copper alloy metallurgy teaches that copper-tin alloys (bronzes) do indeed have superior spring properties. A dispersion strengthened copper-tin bronze has the desired combination of elevated temperature strength retention and high elastic limit. The presence of aluminum and aluminum oxide (for dispersion strengthening) surprisingly does not detract from the ability of the tin to impart elasticity to the final product. Other dispersion strengthened copper/metal alloys are also useful, e.g., DSC/silicon; DSC/aluminum/silicon; DSC/nickel/tin; DSC/zinc/tin; DSC/tin/phosphorus; DSC/nickel/phosphorus.

The closest prior art of which we are aware is the U.S. patent to Gregory No. 3,026,200 directed to a method of introducing a hard phase into a metallic matrix which matrix can be an alloy of several metals including alloys of copper, useful herein. The procedure used to arrive at a dispersion strengthened copper alloy is quite different, however. According to Gregory, the finely divided copper alloy powder is internally oxidized from a surface oxide of the maxtrix followed by consolidating.

It has been found that where a prealloy is made followed by internal oxidation from decomposition of an external oxide as in Gregory, the rate of internal oxidation, which is $O_2$-diffusion rate limited, is one tenth to one twentieth of that achieved with internal oxidation of aluminum, for example, in a copper/aluminum alloy using $Cu_2O$ as an oxidant. The presence of alloying elements inhibits oxygen diffusion from the surface and makes the prior art process commercially unattractive.

SUMMARY OF THE INVENTION

According to the present invention, a dispersion strengthened copper powder is first produced by any process, but preferably that disclosed in Nadkarni U.S. Pat. No. 3,779,714. The dispersion strengthened copper powder is then thoroughly blended with a modifier metal powder, e.g., tin or zinc or mixed tin/zinc. The resulting blend is heat treated in a metal can, e.g., copper, to alloy the constituents and consolidated by hot or cold working, e.g., by extrusion, swaging or rolling or combinations thereof, to at least 90% of theoretical density and preferably 100% of theoretical density. The resultant dispersion strengthened copper alloy, e.g., bronze or brass containing from 0.1% to 40% by weight of metal modifier has the desired properties of the DSC as well as the modification in properties induced by the alloy metal, e.g., springiness in the cold rolled condition and higher ductility in the annealed condition. Exemplary alloys of dispersion strengthened copper may be made in a similar manner, e.g., 90 copper, 10 tin; 98 copper, 2 silicon; 90 copper, 9 aluminum, 1 silicon; copper with up to 20% nickel and 10% tin; copper with 1% nickel and 0.3% phosphorus.

BRIEF DESCRIPTION OF THE DRAWINGS

The invention may be better understood by having reference to the annexed drawings wherein.

DETAILED DESCRIPTION OF THE INVENTION

Figure 1:
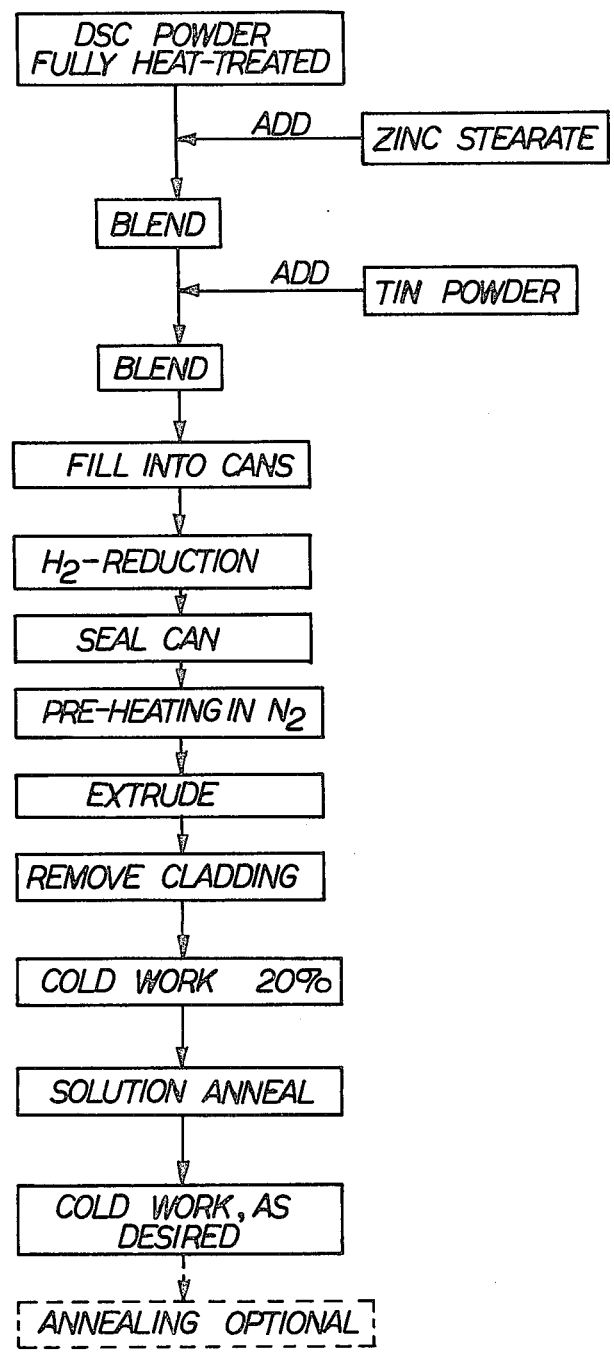
FIG. 1 is a process flow sheet illustrative of the process of the present invention.

As indicated above, the invention is concerned with alloys of dispersion strengthened copper and a process of making such alloys. Basically, the process contemplates starting with a dispersion strengthened copper and alloying it in the powder state with an alloying metal or metals, preferably of high purity, consolidation as by extrusion, swaging and rolling or hot forging to yield a fully dense bar or rod, followed by solution annealing and cold working.

Dispersion strengthening of the copper can be achieved by any of the known methods, such as internal oxidation of a solute metal, mechanical mixing of a refractory oxide, co-precipitation, mechanical alloying, etc. These procedures are well known in the art. The above mentioned patent to Nadkarni 3,779,714 is exemplary as are the U.S. patents to Alexander et al Nos. 3,085,876, and Iler 3,143,789. The preferred method of forming the dispersion strengthened copper powder is that disclosed by Nadkarni in U.S. Pat. Nos. 3,779,714 or 4,274,873, or 4,315,770.

According to the process disclosed in 4,274,873 for making dispersion strengthened copper powder, the powdered copper/aluminum alloy from atomization is sieved to separate particles greater in size than about 180 microns from the smaller particles. These are milled as in a ball mill or rolling mill to reduce the size or thickness of the particles. The particles from each fraction are then internally oxidized with an oxidant such as $Cu_2O$ at 925° C. for about 60 minutes. The internally oxidized copper fractions are then blended for use herein. The disclosure of U.S. Pat. No. 4,274,873 is incorporated herein by reference. Patent 4,315,770 is directed to a process for producing dispersion strengthened copper powder starting with atomized copper/aluminum alloy particlws which are free of surface oxide film. These particles are then internally oxidized such as by the process disclosed in U.S. Pat. No. 3,779,714. The disclosure of U.S. Pat. Nos. 3,779,714 and 4,315,770 are incorporated herein by reference.

In the final compositions of this invention dispersion strengthened copper is present in an amount greater than 50%, generally from 55% to 98% by weight, balance alloying metal or metals, and most usefully about 90% by weight. The extent of refractory oxide in the DSC is calculated as the metal equivalent broadly and ranges from 0.05% to 5%. For most purposes an amount of aluminum oxide (as the metal) ranging from 0.1% to 0.65% is used. A series of commercially available products of this type are marketed under the trademark "Glidcop", a registered trademark of SCM Corporation. These materials have particle sizes in the range of 0.1 to 180 microns.

Suitable alloying metals in powder form include tin, zinc, silicon, magnesium, zirconium, beryllium, silver, chromium, iron, nickel, phosphorus, titanium, and mixtures of two or more such alloying metals. These metals are blended with the DSC as the powder by any suitable means, which may include ball milling with or without a liquid medium. The particle size of the alloying metal is in the range of from 0.1 to 180 microns. For most purposes a −325 mesh (Tyler) material is satisfactory.

A convenient process for forming the modified DSC compositions hereof involves forming the powder mix by blending the DSC and powdered alloying metal and placing in a cylindrical copper can. The unsealed can containing the powder mixture is then heat treated in a furnace above about 1200° F. (649° C.) under a protective atmosphere for 30 minutes or more. The unsealed can is allowed to cool to room temperature while still in a protective atmosphere. The fill tube of the can is then sealed and the can reheated to 1450° F. (788° C.) or higher in a nitrogen atmosphere for 45 minutes or more, and hot extruded to a substantially fully dense mass. The extruded shape can be further cold worked by processes such as drawing, rolling, swaging, forging. Homogenization treatments are often necessary to obtain uniform alloying and these can be carried out between cold working passes as desired.

A particular advantage of the present invention is in its ability to produce dispersion strengthened bronze compositions as exemplified above. These compositions comprise from 0.1% to 40% by weight of modifier alloying element or elements selected from aluminum, tin, silicon or mixtures thereof. The bronzes hereof are preferably formed from a pre-made internally oxidized dispersion strengthened copper powder and a modifier metal powder. The dispersion strengthening agent is a refractory metal oxide such as alumina, silica, thoria, beryllia, zirconia formed in situ, alumina being highly preferred. The principal ingredient of the bronzes hereof is, of course, copper with no more than incidental impurities. Because of the manner of making these materials, the composition is substantially uniform throughout.

Dispersion strengthened bronze (DSB) made by alloying a 0.20% aluminum dispersion strengthened copper ("Glidcop" AL-20) with tin has mechanical properties that are superior to both "Glidcop" AL-20 and phosphor bronze. DSB combines the modes of hardening found in dispersion strengthened copper and phosphor bronze. DSC exhibits high strength levels and retains these levels very well after exposure to high temperature. Phosphor bronze is a solid solution strengthened alloy that has the ability to develop higher strength levels upon cold working. Phosphor bronze also possesses a straight-line relationship between stress and strain in the elastic region and a sharp yield point. These properties of phosphor bronze make it an ideal material for spring type applications. However, phosphor bronze softens drastically when it is annealed. DSB, on the other hand, is found to possess the most desirable qualities in each of these commercial alloys.

DSB retains its strength very well after exposure to high temperatures (brazing temperatures). It work hardens rapidly as phosphor bronze does, exhibiting higher yield strength and tensile strength than phosphor bronze for any given amount of cold working. DSB also exhibits a straight-line relationship in the elastic portion of the stress-strain curve terminating with a sharp yield point. Like DSC, it resists softening when exposed to high temperatures. Hence, DSB possesses all the qualities required for a good spring material.

A major distinction between the process used for making conventional alloys, such as phosphor bronze, and the process used for making dispersion strengthened bronze, is that in the latter the copper matrix remains essentially in a solid state. The alloying element may melt but eventually diffuses into the copper matrix via solid state diffusion. Appreciable melting of the copper matrix or the alloy form by diffusion is undesirable since it would destroy the structure of the base alloy, i.e., copper $+Al_2O_3$ dispersion strengthened alloy. Therefore the process for making D.S.B. involves initial melting of tin and subsequent alloying with copper $+Al_2O_3$ alloy by solid state diffusion. At the same time, it is required that uniform chemical composition is achieved in the alloy. It is also necessary that formation of any tin oxide is prevented during the process. Any tin oxide if formed during the process, can cause serious brittleness in the final product. It may be mentioned here that, the main purpose of adding a small amount of phosphorus in the conventional alloy, phosphor bronze, is for the prevention of tin oxide formation during the melting and casting steps.

The process of the present invention utilizes several steps to achieve chemical homogeneity in the alloy and to supress the formation of tin oxides. Homogeneity of alloying is achieved most satisfactorily by properly blending the tin powder prior to canning and by solution annealing the extruded fully dense bar. Prevention of tin oxide formation is achieved by heat-treating of the powder mix in protective atmosphere prior to extrusion.

The annexed drawing illustrates the process of the invention as applied to a dispersion strengthened bronze.

The following example is for illustrative purposes only and is not to be construed as limiting the invention to the scope thereof.

EXAMPLE I

Referring to FIG. 1 of the annexed drawings welded copper extrusion cans measuring 1⅜" diameter (O.D.)×2¼" long, with ¼" O.D.×½" long fill-tubes, were used for extrusion. The as-received cans were "cleaned" by heating them in a furnace under dissociated ammonia atmosphere, at a temperature of 1200° F. for 15 minutes. This step reduced the oxides of copper left on both inside and outside surfaces of the can from the welding operation.

"Glidcop" (AL-20) DSC powder from a production lot was blended with 1% by weight of a suitable powder metallurgy lubricant, for example 1% zinc-stearate powder, in a double cone blender for 20 minutes. Desired amounts of highest purity tin powder was added to the DSC powder and blending was continued for 30 minutes more. The blended powder was then fed into billet cans.

The filled billet can was then placed in a tube furnace maintained at 900° F., under hydrogen atmosphere, to permit the lubricant to burn-off which usually took about 20 minutes. The furnace temperature was then raised to 1450° F. and the billet was heated at this temperature for 30 minutes. Following this the billet was cooled in the cooling zone of the furnace still under hydrogen atmosphere.

The fill-tube of the billet was then closed and the billet re-heated in a nitrogen atmosphere muffle furnace at 1450° F. for 45 minutes. The heated billet was extruded into a rectangular bar. The cross-section of the extruded bar measured 0.50"×0.188" with rounded corners giving an extrusion ratio of 16:1. The extrusion die pre-heat temperature was 900° F.+50° F.

The extruded bar was de-clad by machining. Solution annealing was carried out by heating at 1450° F. for time periods ranging from two to three hours in an atmosphere of nitrogen. This temperature was low enough not to risk substantially melting the matrix and yet high enough for rapid diffusion of tin and copper atoms, to achieve complete alloying.

After solution annealing, the bar was cold worked to the desired temper and then machined into tensile test specimens conforming to ASTM specifications. Some of the strips were annealed at different temperatures ranging from 900° F. to 1250° F., before testing. Nitrogen atmosphere was used in the furnaces for annealing runs.

The process steps and mechanical properties of "Glidcop" (AL-20), Phosphor Bronze, and D.S. Bronze are tabulated in Table 1.

TABLE 1
PROCESS CONDITIONS AND MECHANICAL PROPERTIES OF PHOSPHOR BRONZE, DISPERSION-STRENGTHENED BRONZE (D.S.B.) AND GLIDCOP (Al-20)

| Material | Process Steps and Final Metallurgical Condition | Final Gage, Inch | Yield Strength, KSI | Tensile Strength, KSI | Elongation, % |
|---|---|---|---|---|---|
| D.S.B. - 2% Sn | Extrusion - Declad - C.W. 38% - Anneal 1450° F., 1 hr. - C.W. 44% | .058 | 73.2 | 99.7 | 7 |
| Phos. Bronze - 5% Sn | As Purchased Strip, Gage .051", Amount of C.W. unknown | .051 | 92.5 | 95.3 | 5 |
| Phos. Bronze - 5% Sn | As Purchased Strip - Annealed at 1250° F., 30 min. | .051 | 18.8 | 46.5 | 51 |
| D.S.B. - 5% Sn | Extrusion - Declad - C.W. 50% - Soln. Anneal - C.W. 40% - Anneal 1250° F., 20 min. | .040 | 56.2 | 68.8 | 32 |
| Al-20 | Extrusion - Declad - Anneal - C.W. 66% - Anneal 1250° F., 20 min. | .037 | 52.2 | 61.3 | 14 |
| Phosp. Bronze - 5% Sn | Anneal 1250° F., 1 hr. - C.W. 66% - Anneal 900° F., 45 min. | .017 | 65.5 | 70.1 | 49 |
| D.S.B. - 5% Sn | Extrude - Declad - C.W. 20% - Soln. Anneal - C.W. 66% - Anneal 900° F., 45 min. | .027 | 63.6 | 74.0 | 27 |
| Al-20 | Extrude - Declad - C.W. 20% - Soln. Anneal - C.W. 66% - Anneal 900° F., 45 min. | .037 | 59.0 | 65.0 | 14 |
| Phos. Bronze - 5% Sn | Anneal 1250° F., 1 hr. - C.W. 66% - Anneal 1000° F., 45 min. | .017 | 25.4 | 52.9 | 44 |
| D.S.B. - 5% Sn | Extrude - Declad - C.W. 20% - Soln. Anneal - C.W. 66% - Anneal 1000° F., 45 min. | .023 | 57.4 | 68.9 | 29 |
| Al-20 | Extrude - Declad - C.W. 20% - Soln. Anneal - C.W. 66% - Anneal 1000° F., 45 min. | .037 | 56.4 | 63.8 | 16 |
| Phos. Bronze - 5% Sn | Anneal, 1250° F., 1 hr. - C.W. 66% - Anneal 1100° F., 45 min. | .017 | 19.8 | 49.2 | 54 |
| D.S.B. - 5% Sn | Extrude - Declad - C.W. 20% - Soln. Anneal - C.W. 66% - Anneal 1100° F., 45 min. | .027 | 55.1 | 69.0 | 29 |
| Al-20 | Extrude - Declad - C.W. 20% - Soln. Anneal - C.W. 66% - Anneal 1100° F., 45 min. | .037 | 54.6 | 61.9 | 14 |
| Phos. Bronze - 5% Sn | Anneal 1250° F., 1 hr. - C.W. 66% - Anneal 1200° F., 45 min. | .017 | 18.4 | 47.0 | 51 |
| D.S.B. - 5% Sn | Extrude - Declad - C.W. 20% - Soln. Anneal - C.W. 66% - Anneal 1200° F., | .023 | 58.4 | 68.0 | 32 |

TABLE 1-continued
PROCESS CONDITIONS AND MECHANICAL PROPERTIES
OF PHOSPHOR BRONZE, DISPERSION-STRENGTHENED
BRONZE (D.S.B.) AND GLIDCOP (Al-20)

| Material | Process Steps and Final Metallurgical Condition | Final Gage, Inch | Yield Strength, KSI | Tensile Strength, KSI | Elongation, % |
|---|---|---|---|---|---|
| Al-20 | Extrude - Declad - C.W. 20% - Soln. Anneal - C.W. 66% - Anneal 1200° F., 45 min. | .037 | 54.5 | 61.3 | 16 |
| Phos. Bronze - 5% Sn. | Anneal, 1250° F., 1 hr. - C.W. 30% | .036 | 64.0 | 68.2 | 15 |
| Phos. Bronze - 5% Sn | Anneal, 1250° F., 1 hr. - C.W. 50% | .025 | 82.2 | 85.9 | 4 |
| Phos. Bronze - 5% Sn | Anneal, 1250° F., 1 hr. - C.W. 66% | .017 | 91.8 | 93.8 | 3 |
| Phos. Bronze - 5% Sn | Anneal, 1250° F., 1 hr. - C.W. 82% | .012 | 102.2 | 104.7 | 2 |
| D.S.B. - 5% Sn | Extrude - Declad - C.W. 40% - Soln. Anneal - C.W. 30% | .041 | 84.3 | 92.0 | 5 |
| D.S.B. - 5% Sn | Extrude - Declad - C.W. 40% - Soln. Anneal - C.W. 50% | .030 | 95.1 | 109.1 | 5 |
| D.S.B. - 5% Sn | Extrude - Declad - C.W. 40% - Soln. Anneal - C.W. 63% | .019 | 107.6 | 116.3 | 4 |
| D.S.B. - 5% Sn | Extrude - Declad - C.W. 20% - Soln. Anneal - C.W. 75% | .020 | 112.2 | 120.1 | 2 |
| D.S.B. - 5% Sn | Extrude - Declad - C.W. 20% - Soln. Anneal - C.W. 82% | .017 | 115.4 | 124.0 | 1 |
| Al-20 | Extrude - Declad - C.W. 40% - Soln. Anneal - C.W. 30% | .041 | 54.9 | 65.0 | 12 |
| Al-20 | Extrude - Declad - C.W. 40% - Soln. Anneal - C.W. 50% | .030 | 61.8 | 68.1 | 10 |
| Al-20 | Extrude - Declad - C.W. 40% - Soln. Anneal - C.W. 66% | .018 | 65.5 | 70.5 | 7 |
| Al-20 | Extrude - Declad - C.W. 20% - Soln. Anneal - C.W. 83% | .017 | 67.8 | 72.6 | 4 |

Figure 2:
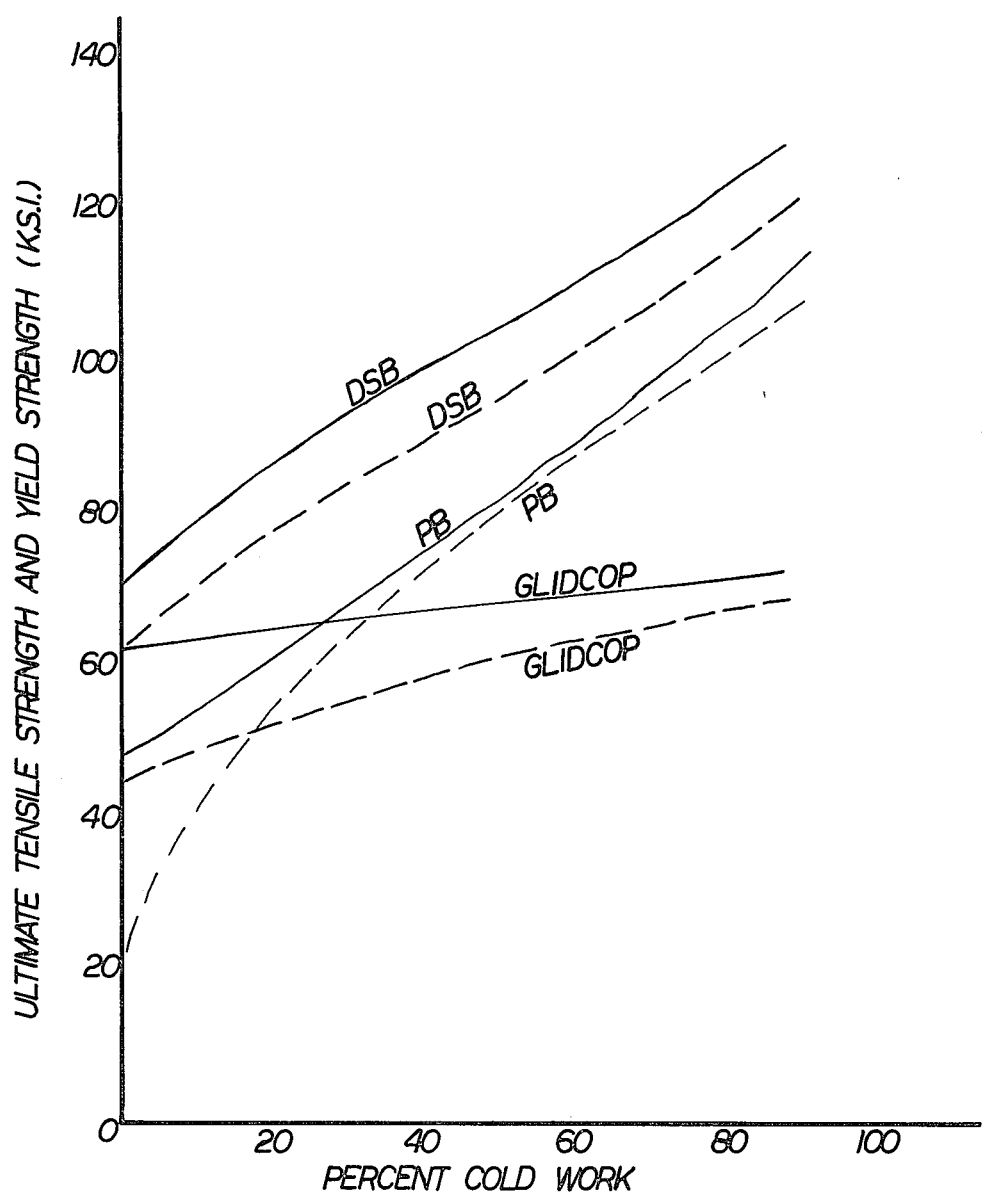
FIG. 2 is a graph showing comparative data for tensile strength (solid line) and yield strength (dotted line) with respect to the amount of cold working for dispersion strengthened copper, phosphor bronze and dispersion strengthened bronze produced in accordance with the process hereof.
Figure 3:
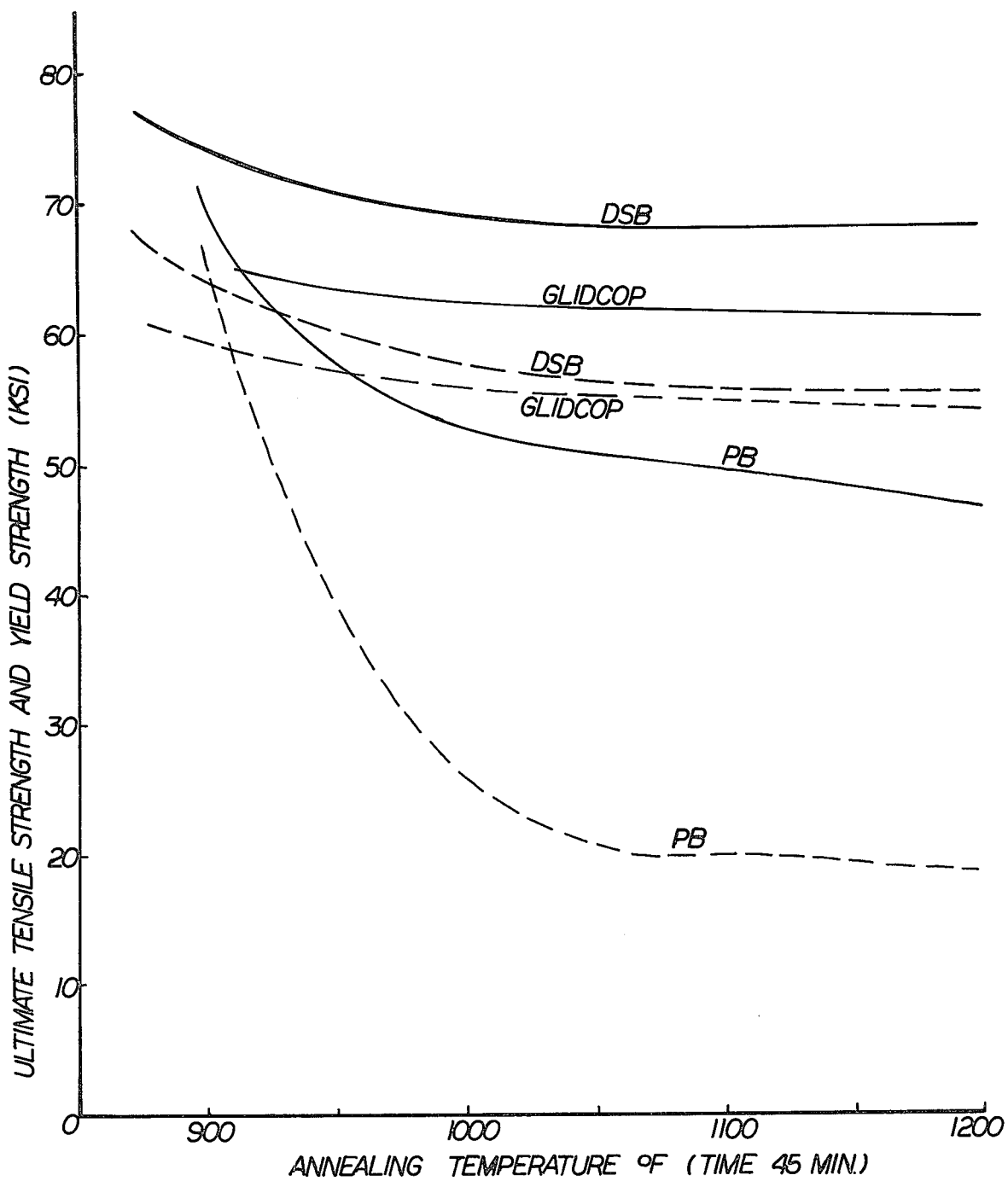
FIG. 3 is a graph comparing tensile (solid line) and yield strengths (dotted line) with annealing temperature for the three materials used in developing FIG. 2.

Tensile strength and yield strength data are plotted as a function of amount of cold work in FIG. 2; and as a function of annealing temperature in FIG. 3. Since the samples were cold worked by rolling strips, the starting thickness of the extruded bar posed some limitations on the maximum amount of cold work that could be given without making the strip too thin for performing tensile testing.

As may be seen in FIG. 2, the ultimate tensile strength of DSB is considerably higher than that of Phosphor Bronze, having the same chemical composition and same amount of cold work. The yield strength of DSB is also considerably greater than that of Phosphor Bronze having the same chemical composition and same amount of cold work. When annealed at temperatures above 900° F., Phosphor Bronze exhibits a sharp drop in both ultimate tensile strength and yield strength. D.S.B., in contrast to Phosphor Bronze, retains its strength quite well after exposure to these high temperatures. In this respect it is similar to "Glidcop".

Comparing D.S.B. with "Glidcop", it is found that, D.S.B. work-hardens more rapidly than "Glidcop". In this respect it is similar to Phosphor Bronze, except that D.S.B. exhibits substantially higher yield strength and tensile strength for same levels of cold work.

Figure 4:
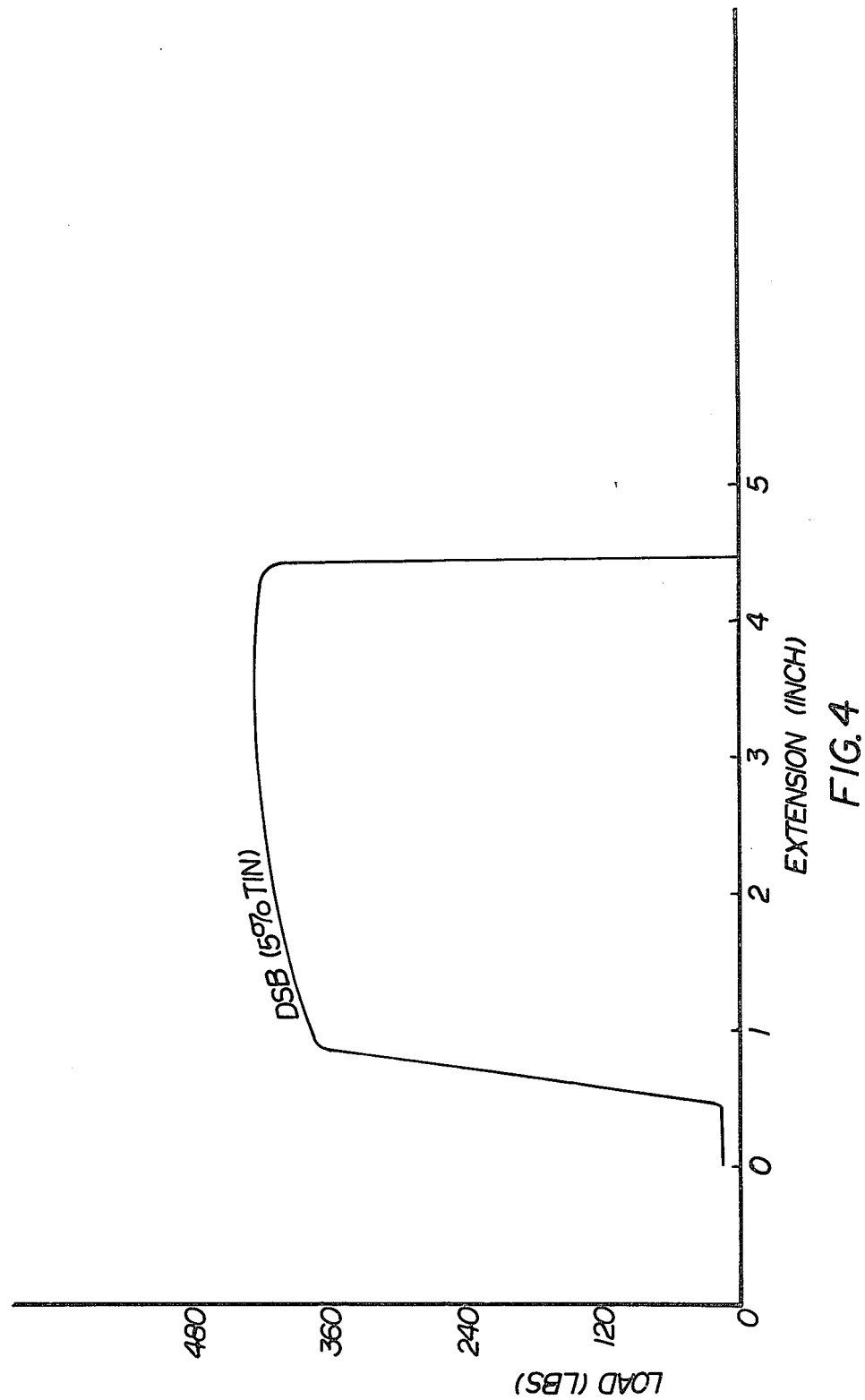
FIG. 4 is a load extension curve for a dispersion strengthened bronze specimen having a gage width of 0.250" and a thickness 0.027 and a gage length of 1 inch.

The elastic portion of the stress-strain curve of D.S.B., like that of Phosphor Bronze, is a "straight-line", as shown in FIG. 4, "Glidcop" on the other hand has a gradually changing slope in the elastic portion of the stress-strain curve, similar to that of pure copper. For spring type of applications, a straight-line shape of stress-strain curve is highly desirable. In this respect D.S.B. is more suitable as a spring material than "Glidcop". The modulus of elasticity of all three materials is considered to be nearly the same (i.e., 16,000,000 psi).

DSB is found to be superior to Phosphor Bronze of similar chemistry due to its higher yield strength and tensile strength upon cold working, and due to its ability to retain most of the strength after exposure to temperatures normally anticipated in brazing operations (i.e., 900° F.–1200° F.). Although one can achieve the strength levels attained in cold worked D.S.B., by taking a Phosphor Bronze of higher tin content, DSB is considered attractive, for two basic reasons: (1) D.S.B. of lower tin content has resistance to annealing and superior wear resistance due to aluminum oxide dispersoids in its matrix, and (2) a higher tin composition Phosphor Bronze is more difficult to process due to its embrittling tendencies; it has lower electrical conductivity and will also cost substantially higher due to the increased tin content. Scrap loss for conventionally made Phosphor Bronze is much greater than scrap loss incurred in the powder metallurgy process for D.S.B.

We claim:

1. A process for making a modified dispersion strengthened copper alloy which comprises blending a major amount of an unmodified pre-made dispersion strengthened copper powder containing a refractory metal oxide in an amount sufficient to strengthen the copper, and a minor amount of one or more powdered modifying metals different from copper and alloyable therewith, and heating said blend to a temperature below the melting point of copper and sufficient to alloy at least a part of said modifying metal or metals with said copper.

2. The product produced by the process of claim 1.

3. A process as defined in claim 1 further characterized by compacting and densifying the blended partially alloyed powder to at least 90% of theoretical density.

4. A process as defined in claim 1 further characterized by placing the powder in a copper can and extruding the canned powder to achieve maximum density and provide a sheathed densified product.

5. A process as defined in claim 4 further characterized by removing the copper sheath.

6. A process as defined in claim 1 wherein the dispersion strengthened copper is internally oxidized.

7. A process as defined in claim 1 wherein the dispersion strengthened copper powder is formed by internally oxidizing a copper/aluminum alloy powder which is substantially free of surface oxide coating.

8. A process as defined in claim 1 wherein the internally formed refractory metal oxide is alumina.

9. A process as defined in claim 1 wherein the modifying metal comprises tin.

10. A dispersion strengthened copper alloy comprising from 0.1% to 40% by weight of an alloying element selected from the group consisting of zinc, magnesium, zirconium, beryllium, silver, chromium, iron, aluminum, phosphorus, nickel, silicon, tin, titanium or mixtures thereof, from 0.05% to about 5.0% by weight of uniformly dispersed internally generated refractory metal oxide for imparting dispersion strengthening to said copper alloy and the balance copper with incidental impurities, said copper alloy having a substantially uniform composition throughout.

11. A copper alloy as defined in claim 10 wherein the alloying element comprises tin.

12. A copper alloy as defined in claim 10 containing between 2% and 5% by weight of tin.

13. A process as defined in claim 1 wherein the alloying of at least part of said modifying metal or metals is by solid state diffusion.

* * * * *